(12) United States Patent
Gresley

(10) Patent No.: US 8,025,129 B2
(45) Date of Patent: *Sep. 27, 2011

(54) OVERRUNNING CLUTCH PARKING BRAKE ACTUATOR

(75) Inventor: Ross Gresley, Fort Mill, SC (US)

(73) Assignee: Schaeffler KG, Herzogenaurach (DE)

( * ) Notice: Subject to any disclaimer, the term of this patent is extended or adjusted under 35 U.S.C. 154(b) by 645 days.

This patent is subject to a terminal disclaimer.

(21) Appl. No.: 12/146,999

(22) Filed: Jun. 26, 2008

(65) Prior Publication Data

US 2009/0188769 A1    Jul. 30, 2009

Related U.S. Application Data

(60) Provisional application No. 61/023,467, filed on Jan. 25, 2008.

(51) Int. Cl.
 *F16D 65/14* (2006.01)
(52) U.S. Cl. .......................... 188/2 D; 188/18 R; 188/25

(58) Field of Classification Search .................. 188/2 D, 188/24.14, 24.15, 24.18, 22, 25, 26, 17, 18 R; 192/219.3, 223, 2; 74/502.3, 500.5, 501.5 R
See application file for complete search history.

(56) References Cited

U.S. PATENT DOCUMENTS

| 1,694,181 | A | * | 12/1928 | Kaplon | 192/219.3 |
|---|---|---|---|---|---|
| 2,812,044 | A | * | 11/1957 | Cole, Jr. | 192/223.2 |
| 3,011,606 | A | * | 12/1961 | Ferris et al. | 192/45 |
| 3,110,380 | A | * | 11/1963 | Meyer et al. | 192/223.4 |
| 5,170,867 | A | * | 12/1992 | Ojima et al. | 188/291 |
| 6,267,218 | B1 | * | 7/2001 | Hochmuth et al. | 192/223.2 |
| 6,382,048 | B1 | * | 5/2002 | Youn et al. | 74/529 |
| 6,530,461 | B2 | * | 3/2003 | Kurita et al. | 192/44 |
| 2008/0041689 | A1 | * | 2/2008 | Hanna et al. | 192/219.5 |

FOREIGN PATENT DOCUMENTS

DE    3343268 A1 * 3/1985

* cited by examiner

*Primary Examiner* — Xuan Lan Nguyen
(74) *Attorney, Agent, or Firm* — Lucas & Mercanti, LLP

(57) ABSTRACT

Parking brake actuator is an overrunning single directional clutch which provides for infinite locking positions.

8 Claims, 5 Drawing Sheets

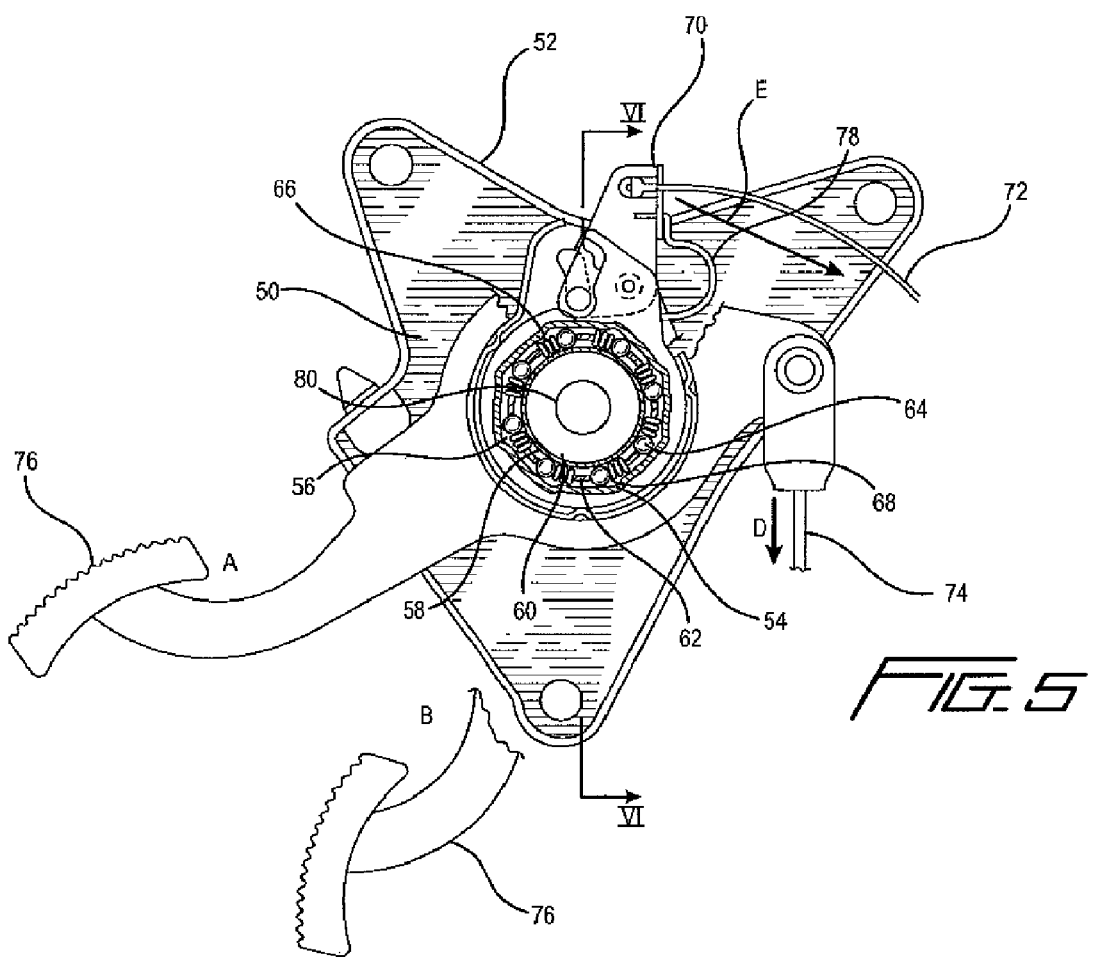

OVERRUNNING CLUTCH PARKING BRAKE ACTUATOR

FIELD OF THE INVENTION

This invention relates to motor vehicles, and more particularly to a parking brake actuator used in motor vehicles.

BACKGROUND OF THE INVENTION

Most motor vehicles have a manually operated parking brake which is operated by either a hand lever or a foot pedal. This disclosure will relate to a foot operated parking brake, but it is recognized that the invention described could also be applied to a hand park brake. The parking brake actuator is connected to the foot pedal and to a cable which, in turn, is connected to the parking brake itself. The parking brake actuator sets the parking brake by pulling on the cable in response to someone pushing on the foot pedal. The actuator applies tension to the cable to set the brake. Releasing the tension in the cable releases the parking brake. Typically, the actuator is released either through a foot pedal or through a hand lever.

Typically, a parking brake actuator is either a ratchet-pawl mechanism, or a spring or tension spring-clutch mechanism.

The ratchet-pawl mechanism and the tension spring-clutch mechanism used for parking brake actuators have a number of drawbacks. Because a pawl and a ratchet are dependent upon tooth spacing for engagement, the operator must overtension the brake cable to avoid cable slack when setting the brake. Noise is also an issue as the pawl moves over the ratchet or sector gear as the operator sets the brake. The spring-clutch drawback is the large amount of tolerance in the mechanism resulting in a wide spread of tension on the brake cable. Breakage of the binding ends of the torsion spring is also a problem. Both of these actuators use several separate components to release the brake.

OBJECTS OF THE INVENTION

It is the object of this invention to provide an improved vehicle parking brake actuator of the type that is set by tensioning a cable, by pressing a foot pedal and employing a clamping mechanism which is fit to the pedal arm and mounted to a bracket in the vehicle. Further, it is the object of the invention to provide a parking brake release as part of the clutch mechanism to return the actuator to its retracted position. It is also the object of this invention to create such a clamping arrangement that is economical to build and mount within the vehicle and for which the parts and transportation costs are decreased.

These and other objects and advantages of the invention become more readily apparent from the following description.

SUMMARY OF THE INVENTION

The objects of the invention are obtained by using an overrunning clutch mechanism as a parking brake actuator. Such overrunning clutch mechanism greatly simplifies the amount of components and reduces the cost associated with conventional parking brake actuators. The actuator of the invention is designed in such a way that the components can be formed from sheet metal parts made with chipless technology. This makes the actuator of the invention especially economical since it can be mass produced and there is no need for cleaning of chips or shavings. The actuator of the invention may be made through a drawing, stamping, rolling, or a combination of these processes The actuator of the invention has all its components formed integrally into a complete module ready for installation with a parking brake pedal arm and a mounting bracket for greatly simplifying the final assembly. The actuator of the present invention can be used as a single module which can then be applied in several different applications, thereby reducing the number of components needed. The actuator of the invention eliminates overtensioning of the cable when setting the brake and also reducing the operator's effort of the foot brake operation.

The safety is enhanced with the parking brake actuator of the present invention, because its design can be configured so as not to protrude into the passenger compartment as much as conventional parking brake actuators in the foot operated parking brake mechanism.

Broadly, the invention can be defined as a parking brake actuator comprising:

a mounting bracket for mounting to a vehicle;

an outer sleeve mounted on the mounting bracket and extending axially outward from the mounting bracket, the outer sleeve having a plurality of inner bearing ramps;

an inner sleeve coaxial with and rotatably mounted inside the outer sleeve, the inner sleeve having an outer bearing surface which radially opposes the inner bearing ramps, the inner sleeve affixable to a parking brake cable;

a plurality of cam rollers mounted in a cage, the cage coaxial with and mounted between the inner and outer sleeve, the cam rollers spring biased against the inner bearing ramps of the outer sleeve and the outer bearing surface of the inner sleeve in a blocked position preventing rotation of the inner sleeve in one direction;

a lever affixed to and extending radially from the cage for rotating either the cage or the outer sleeve to unblock the rollers and allow the inner sleeve to rotate in the one direction and release the parking brake; and a return spring to return the rollers to the blocked position.

Preferably, the brake actuator of the invention further comprises a center shaft fixed to the mounting bracket, extending radially outward from the mounting bracket and about which the inner and the outer sleeve are mounted in a coaxial manner. The inner sleeve is rotatable about the center shaft.

Either the cage or the outer sleeve are rotatably mounted in the actuator. If the cage is rotatably mounted between the inner and outer sleeve, then the outer sleeve is fixedly mounted to the mounting bracket. On the other hand, if the outer sleeve is rotatably mounted on the mounting bracket, then the cage is fixedly mounted (non-movable) in the actuator.

When the cage is rotatable and the outer sleeve is fixed, the lever rotates the cage in the other direction to place the rollers in the unblocked position and allow the inner sleeve to rotate in the one direction under the pull of the parking brake cable and to release the parking brake. In this embodiment, the return spring is preferably a circular return spring coaxially mounted about the inner sleeve with one end secured to the outer sleeve and the other end secured to the cage. The return spring rotates the cage to place the rollers in the blocked position once tension is released from the lever.

When the outer sleeve is rotatable and the cage is fixed, the lever is movably mounted to a flange extending radially outward from the cage and the lever rotates about a pivot point on the flange. The pivot point being the point of attachment between the lever and the flange of the cage. One end of the lever is attached to a cable to effect movement of the lever while the other end of the lever is linked to the outer sleeve with a pin in a cam slot in the outer sleeve. The movement of the lever rotates and causes the pin to slide in the cam slot which rotates the outer sleeve about the fixed cage and puts the rollers in the unblocked position. This allows the inner sleeve to rotate under the pull from the parking brake cable and to release the parking brake. When tension on the lever is released, the lever is biased by the return spring which causes the lever to rotate the outer sleeve and place the rollers into a blocked position.

The rollers are biased by a compression spring. The rollers can be balls or cylindrical in shape.

BRIEF DESCRIPTION OF THE DRAWINGS

These and other aspects of the present invention may be more readily understood by reference to one or more of the following drawings:

FIG. 5 is a cross-sectional view of the brake actuator of the invention with the rollers in the blocked position, a fixed cage and a rotatable outer sleeve;

FIG. 7 illustrates the actuator of FIG. 5 with the rollers in the unblocked position; and FIG. 8 illustrates an exploded view of the actuator of FIG. 5.

DETAILED DESCRIPTION OF THE DRAWINGS

FIGS. 1-4 illustrate the embodiment of the invention where the cage is rotatable and the outer sleeve is fixed to the mounting bracket while FIGS. 5-8 illustrate the embodiment of the invention where the cage is fixed and the outer sleeve is rotatably mounted to the mounting bracket.

Figure 1:
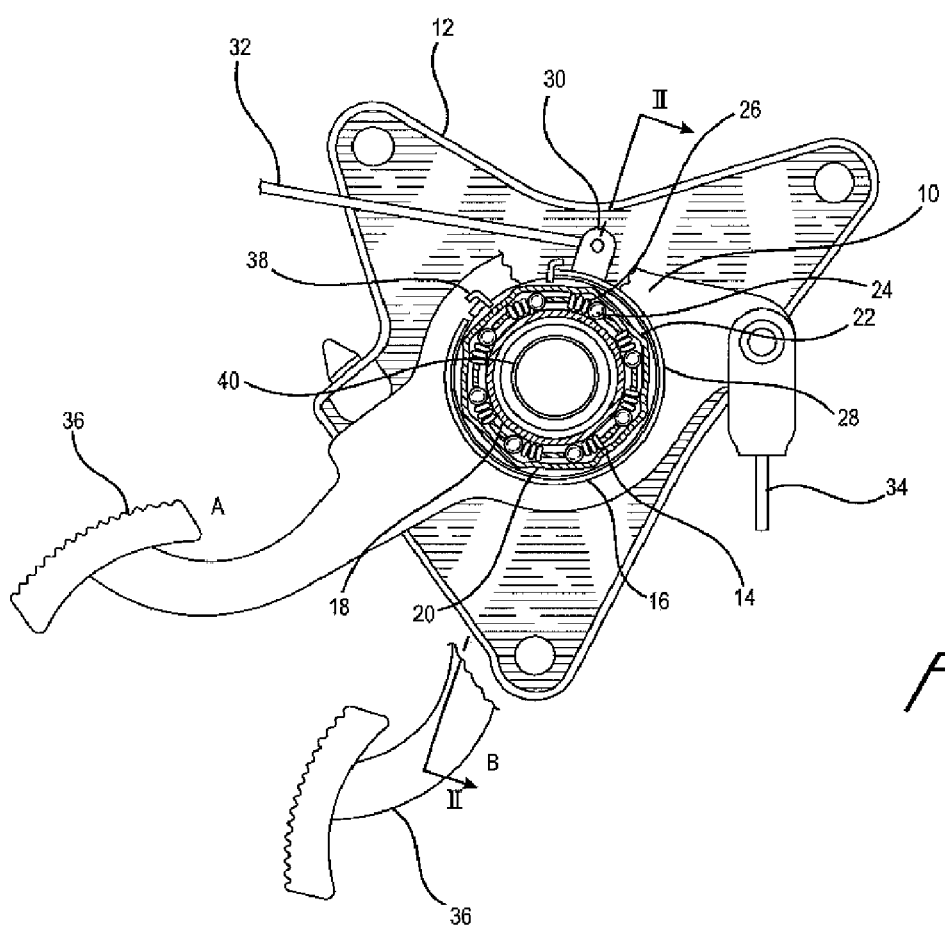
FIG. 1 is a cross sectional view of the brake actuator of the invention with the rollers in the blocked position, a rotatable cage and a fixed outer sleeve.

Turning to FIG. 1, parking brake actuator 10 is illustrated. Parking brake actuator 10 has mounting bracket 12 to which outer sleeve 14 is affixed. Outer sleeve 14 has a plurality of inner bearing ramps 16. Inner sleeve 18 is positioned inside outer sleeve 14 and rotatable therein. Inner sleeve 18 has an outer bearing surface 20. Positioned between outer sleeve 14 and inner sleeve 18 is cage 22. Cage 22 has rollers 24 spring biased by spring 26 into a blocked position. FIG. 1 illustrates the blocked position for rollers 24 of parking brake actuator 10. Each roller 24 is positioned in pocket 28 of cage 22. Lever 30 is affixed to cage 22 and extends radially outward from cage 22. Lever 30 is connected to rod 32 and rod 32 actuates lever 30. Inner sleeve 18 is attached to parking brake cable 34 and to parking brake pedal 36. Position A illustrates parking brake cable 34 in an unset position while position B shows parking brake cable 34 in a set position where parking brake cable 34 has been tensioned to set the parking brake in the parked position. Circular return spring 38 has one end secured to outer sleeve 14 and the other end secured to cage 22. Finally, center shaft 40 is illustrated as affixed to mounting bracket 12 and extending outward therefrom. Inner sleeve 18 rotates about center shaft 40.

Figure 2:
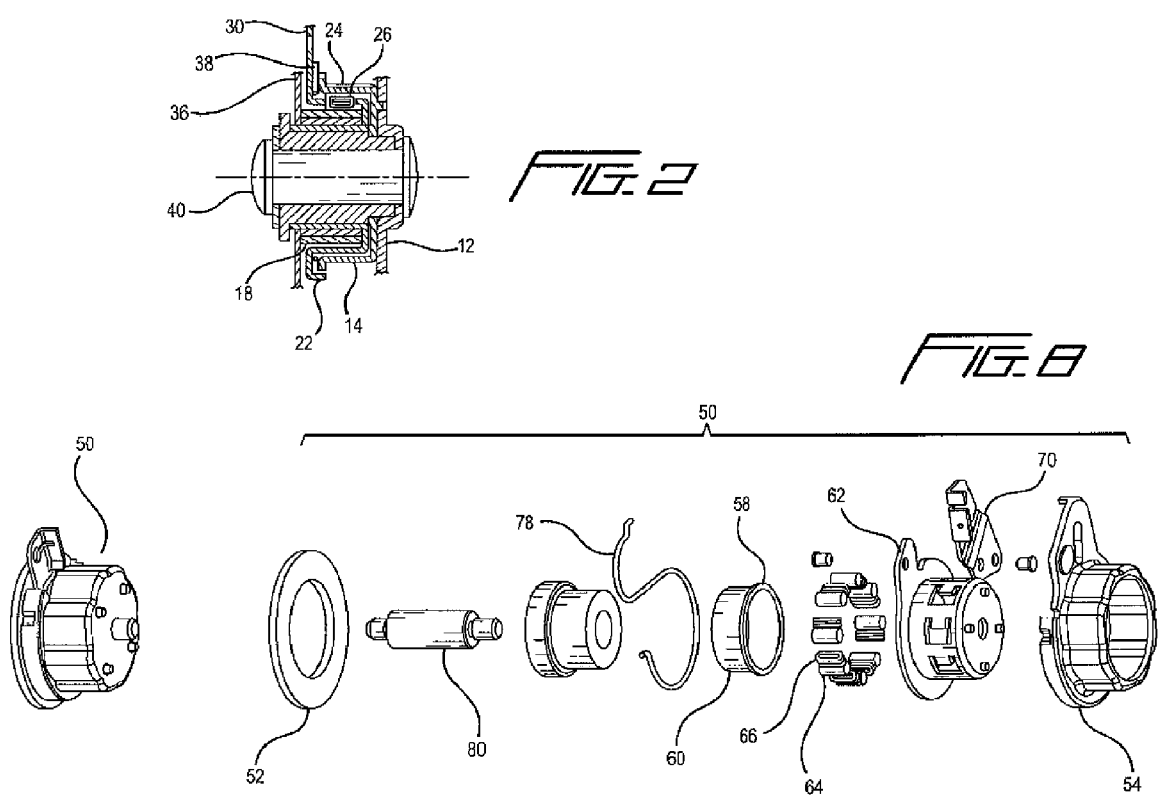
FIG. 2 is a cross section of the actuator of FIG. 1 taken along lines II-II.

FIG. 2 illustrates parking brake actuator 10 in cross section along lines II-II of FIG. 1. As can be seen in FIG. 2, rollers 24 are shown as cylindrical.

Figure 3:
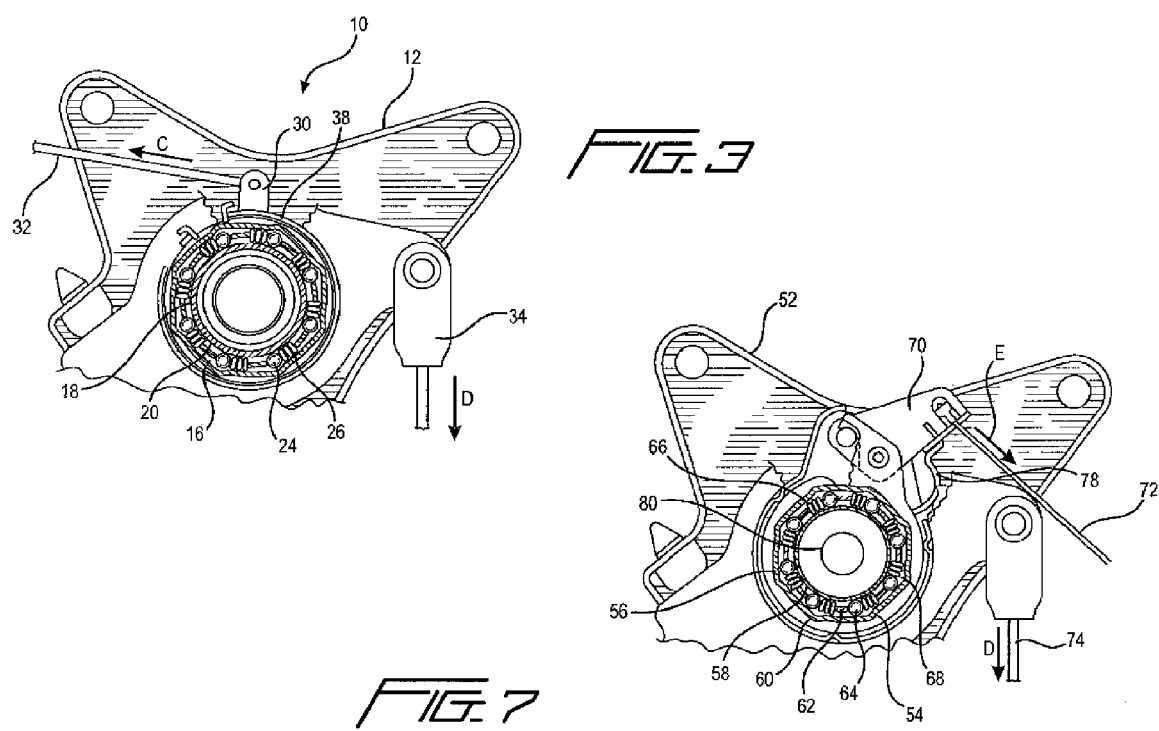
FIG. 3 illustrates the actuator of FIG. 1 with the rollers in the unblocked position.

FIG. 3 illustrates actuator 10 of FIG. 1 when lever 30 is pulled by rod 32 and parking brake cable 34 is released. FIG. 3 illustrates actuator 10 with rollers 24 in the unblocked position where rod 32 is pulled in the direction of arrow C such that lever 30 rotates cage 22 counterclockwise thereby rotating roller 24 to a position between inner bearing ramps 16 and outer bearing surface 20 where rollers 24 are not in blocking contact with ramps 16 and surface 20. In this unblocked position, inner sleeve 18 can then rotate in a clockwise direction due do to the clockwise force exerted on inner sleeve 18 by cable 34 and cable 34 can move in the direction of arrow D. This releases the parking brake.

Once rod 32 is released, circular return spring 38 moves cage 22 in a clockwise direction, thereby setting rollers 24 of actuator 10 into a blocked position by allowing rollers 24 to rotate clockwise and move into blocking contact between ramps 16 and surface 20. This returns actuator 10 to its position shown in FIG. 1 where foot pedal 36 is in position A. As will be recognized, the pushing of foot pedal 36 from position A to position B allows inner sleeve 18 to rotate in a counterclockwise direction, because inner bearing ramps 16 are oriented in one direction.

Figure 4:
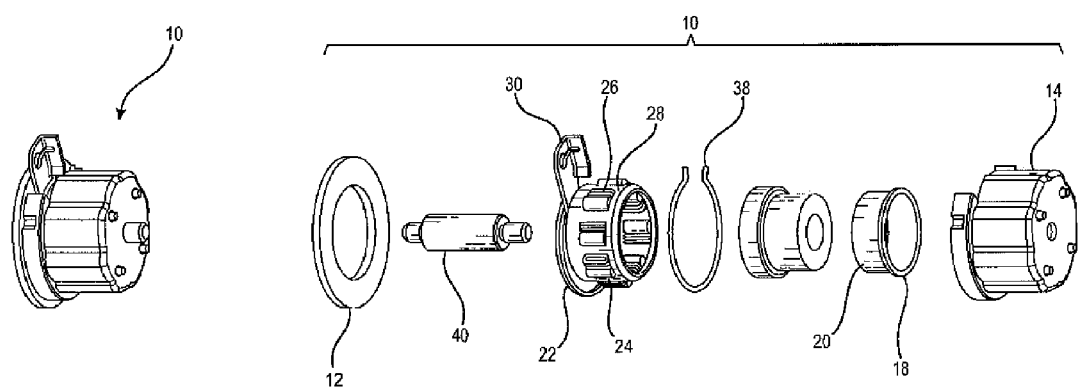
FIG. 4 is an exploded view of the actuator of FIG. 1.

FIG. 4 shows an exploded view of actuator 10 of FIG. 1 of the present invention.

Figure 6:
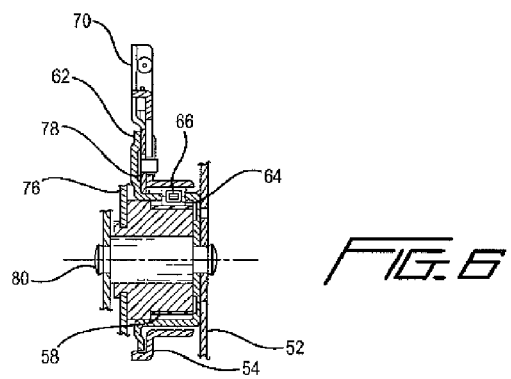
FIG. 6 is a cross section of the actuator of FIG. 5 taken along lines VI-VI.

Turning to FIG. 5, parking brake actuator 50 is illustrated. Parking brake actuator 50 has mounting bracket 52 on which outer sleeve 54 is rotatably mounted. Outer sleeve 54 has a plurality of inner bearing ramps 56. Inner sleeve 58 is positioned inside outer sleeve 54 and rotatable therein. Inner sleeve 58 has an outer bearing surface 60. Positioned between outer sleeve 54 and inner sleeve 58 is cage 62. Cage 62 is affixed to mounting bracket 52. Cage 62 has rollers 64 spring biased by springs 66 into a blocked position. FIG. 5 illustrates the blocked position for rollers 64 of parking brake actuator 50. Each roller 64 is positioned in pocket 68 of cage 62. Lever 70 is affixed to cage 62 and extends radially outward from cage 62. Lever 70 is connected to cable 72 and cable 72 actuates lever 70. Inner sleeve 58 is attached to parking brake pedal arm 76 and to parking brake cable 74. Position A illustrates parking brake cable 74 in an unset position while position B shows parking brake cable 74 in a set position where parking brake cable 74 has been tensioned to set the parking brake in the parked position. Return spring 78 has one end secured to cage 62 and the other end secured to lever 70. Finally, center shaft 80 is illustrated as affixed to mounting bracket 52 and extending outward therefrom. Inner sleeve 58 rotates about center shaft 80. FIG. 6 illustrates parking brake actuator 50 in cross section along lines VI-VI of FIG. 5. As can be seen in FIG. 6, rollers 54 are shown as cylindrical.

FIG. 7 illustrates actuator 50 of FIG. 5 when lever 70 is pulled by cable 72 and parking brake cable 74 is released. FIG. 7 illustrates rollers 64 of actuator 50 in the unblocked position where cable 72 is pulled in the direction of arrow E such that lever 70 rotates outer sleeve 54 clockwise thereby rollers 64 are in a position between inner bearing ramps 56 and outer bearing surface 60 where rollers 64 are not in blocking contact with ramps 56 and surface 60. In this unblocked position, inner sleeve 58 can then rotate in a clockwise direction due to the clockwise force exerted on inner sleeve 58 by cable 74 and cable 74 can move in the direction of arrow D. This releases the parking brake.

Once cable 72 is released, return spring 78 moves outer sleeve 54 in a counter clockwise direction, thereby setting rollers 64 of actuator 50 into a blocked position by the movement of the ramps 56. This returns actuator 50 to its position shown in FIG. 5 where foot pedal 76 is in position A. As will be recognized, the pushing of foot pedal 76 from position A to position B allows inner sleeve 58 to rotate in a counterclockwise direction, because inner bearing ramps 56 are oriented in one direction.

FIG. 8 shows an exploded view of actuator 10 of FIG. 5 of the present invention.

| REFERENCE CHARACTERS | |
|---|---|
| 10 | parking brake actuator |
| 12 | mounting bracket |
| 14 | outer sleeve |
| 16 | inner bearing ramp |
| 18 | inner sleeve |
| 20 | outer bearing surface |
| 22 | cage |
| 24 | rollers |
| 26 | spring |
| 28 | pocket |
| 30 | lever |
| 32 | parking brake rod |
| 34 | parking brake cable |
| 36 | parking pedal |
| 38 | circular return spring |
| 40 | center shaft |
| 50 | parking brake actuator |
| 52 | mounting bracket |
| 54 | outer sleeve |
| 56 | inner bearing ramp |
| 58 | inner sleeve |
| 60 | outer bearing surface |
| 62 | cage |
| 64 | rollers |
| 66 | spring |
| 68 | pocket |
| 70 | lever |
| 72 | cable |
| 74 | parking brake cable |
| 76 | parking pedal |
| 78 | return spring |
| 80 | center shaft |

The invention claimed is:

1. A parking brake actuator, comprising:
a mounting bracket for mounting to a vehicle;
an outer sleeve mounted on the mounting bracket and extending axially outward from the mounting bracket, the outer sleeve having a plurality of inner bearing ramps;
an inner sleeve coaxial with and rotatably mounted inside the outer sleeve, the inner sleeve having an outer bearing surface, the inner sleeve affixable to a parking brake cable;
a plurality of cam rollers mounted in a cage, the cage coaxial with and mounted between the inner and outer sleeve, the cam rollers are biased against the inner bearing ramps of the outer sleeve and the outer bearing surface of the inner sleeve in a blocked position, preventing rotation of the inner sleeve in a first direction;
a lever affixed to and extending radially from the cage for rotating either the cage or the outer sleeve to unblock the cam rollers and allow the inner sleeve to rotate in the first direction and release the parking brake; and
a return spring to return the cam rollers to the blocked position,
wherein the cage is rotatably mounted between the inner sleeve and the outer sleeve, the outer sleeve is fixedly mounted to the mounting bracket, the lever acts on the cage to rotate the cage, and the return spring is a circular spring coaxially mounted about the inner sleeve with one end secured to outer sleeve and the other end secured to the cage.

2. The actuator of claim 1, further comprising a center shaft fixed to the mounting bracket, extending axially outward from the mounting bracket and about which the inner and outer sleeves are mounted, the inner sleeve rotatable about the center shaft.

3. The actuator of claim 1, wherein the cam rollers are biased by a compression spring.

4. The actuator of claim 1, wherein the cam rollers are cylindrical.

5. A parking brake actuator, comprising:
a mounting bracket for mounting to a vehicle;
an outer sleeve mounted on the mounting bracket and extending axially outward from the mounting bracket, the outer sleeve having a plurality of inner bearing ramps;
an inner sleeve coaxial with and rotatably mounted inside the outer sleeve, the inner sleeve having an outer bearing surface, the inner sleeve affixable to a parking brake cable;
a plurality of cam rollers mounted in a cage, the cage coaxial with and mounted between the inner and outer sleeve, the cam rollers are biased against the inner bearing ramps of the outer sleeve and the outer bearing surface of the inner sleeve in a blocked position, preventing rotation of the inner sleeve in a first direction;
a lever affixed to and extending radially from the cage for rotating either the cage or the outer sleeve to unblock the cam rollers and allow the inner sleeve to rotate in the first direction and release the parking brake; and
a return spring to return the cam rollers to the blocked position,
wherein, the cage is fixedly mounted between the inner sleeve and the outer sleeve; the outer sleeve is rotatably mounted to the mounting bracket; the lever acts on the outer sleeve to rotate the outer sleeve; and the return spring biases the lever to cause the lever to rotate the outer sleeve.

6. The actuator of claim 5, further comprising a center shaft fixed to the mounting bracket, extending axially outward from the mounting bracket and about which the inner and outer sleeves are mounted, the inner sleeve rotatable about the center shaft.

7. The actuator of claim 5, wherein the cam rollers are biased by a compression spring.

8. The actuator of claim 5, wherein the cam rollers are cylindrical.

* * * * *